July 25, 1933. C. DRESSLER 1,919,322
METHOD OF AND APPARATUS FOR GLAZING CERAMIC WARE
Filed Oct. 3, 1930 4 Sheets-Sheet 1
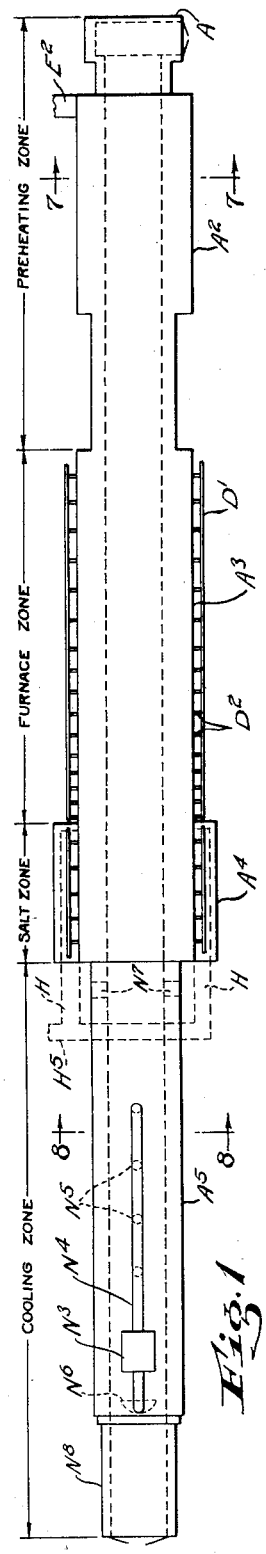
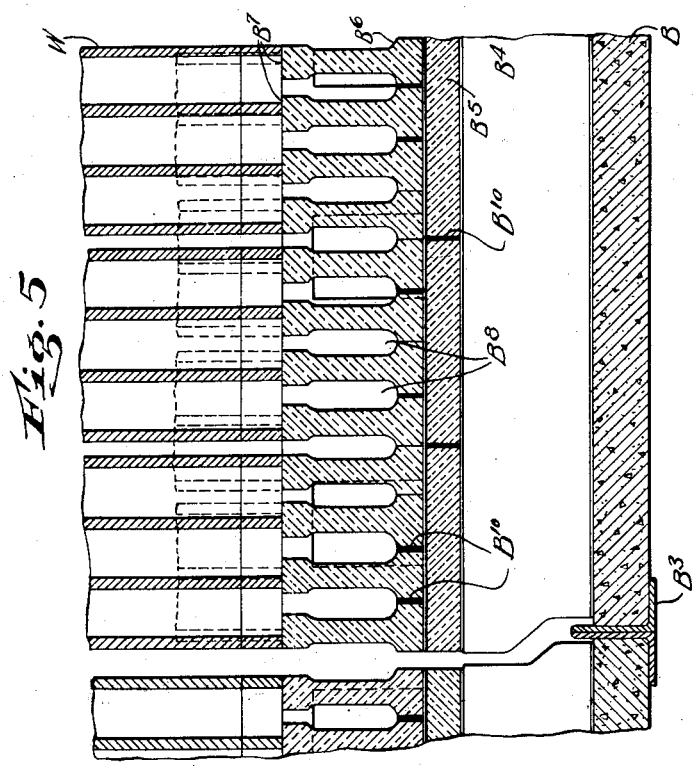
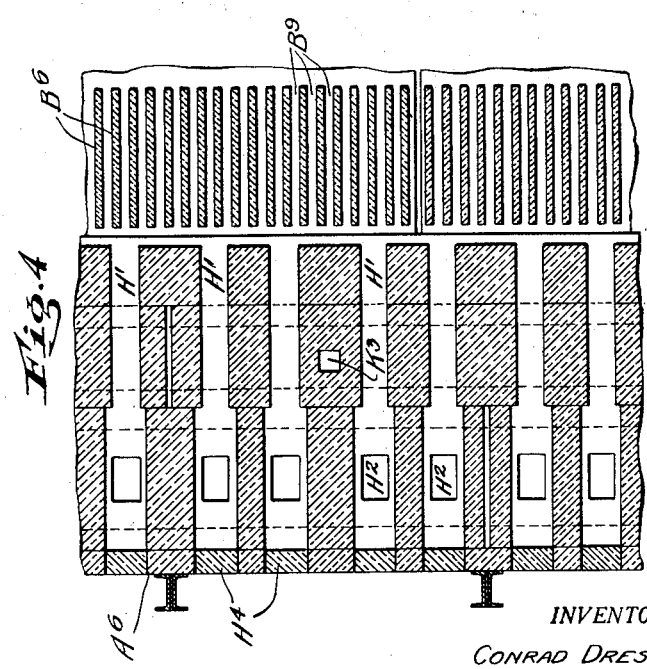
INVENTOR.
CONRAD DRESSLER
BY John E. Hubbell
ATTORNEY July 25, 1933.  C. DRESSLER  1,919,322
METHOD OF AND APPARATUS FOR GLAZING CERAMIC WARE
Filed Oct. 3, 1930  4 Sheets-Sheet 2
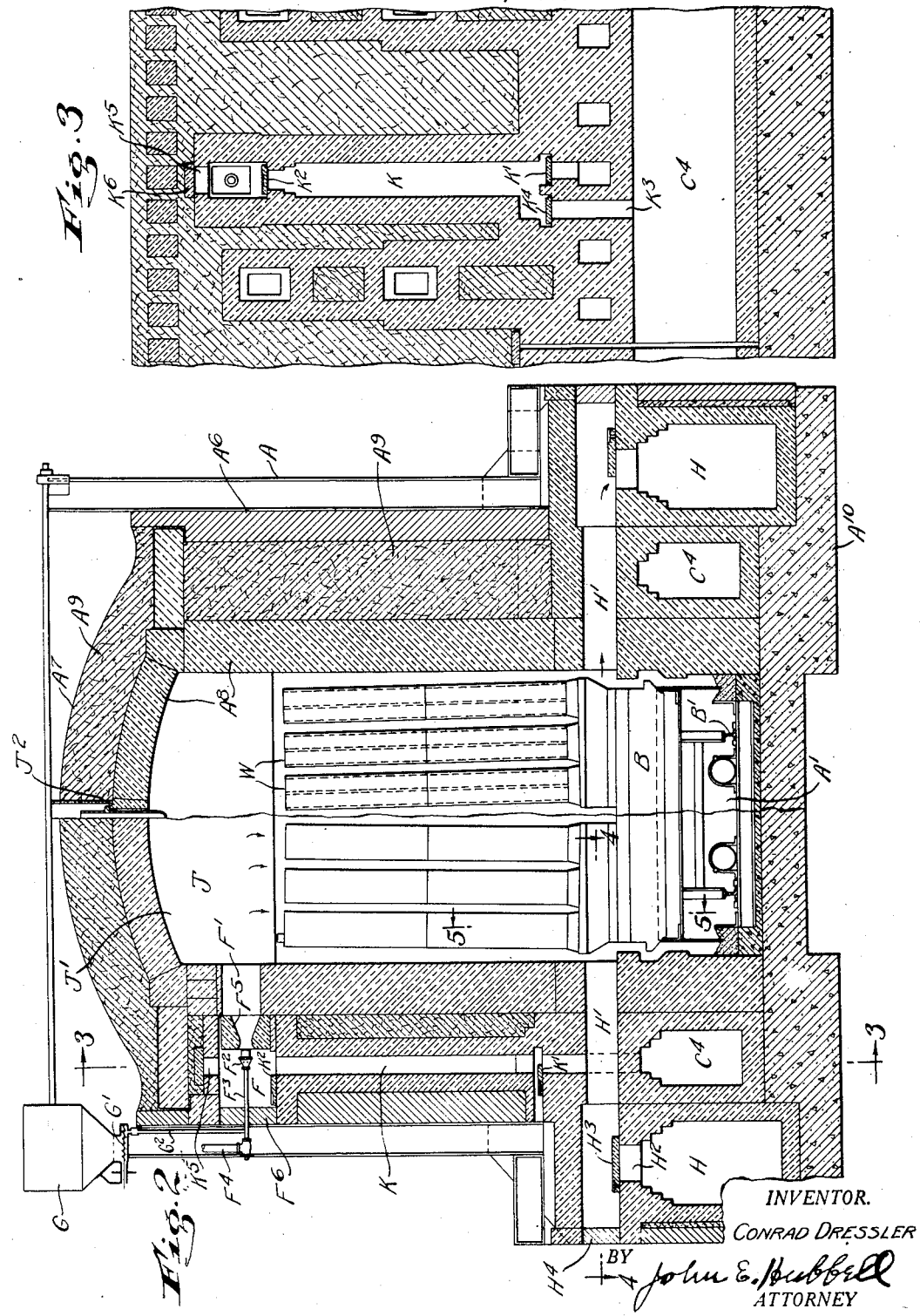
INVENTOR.
CONRAD DRESSLER
BY John E. Hubbell
ATTORNEY July 25, 1933. C. DRESSLER 1,919,322
METHOD OF AND APPARATUS FOR GLAZING CERAMIC WARE
Filed Oct. 3, 1930 4 Sheets-Sheet 3
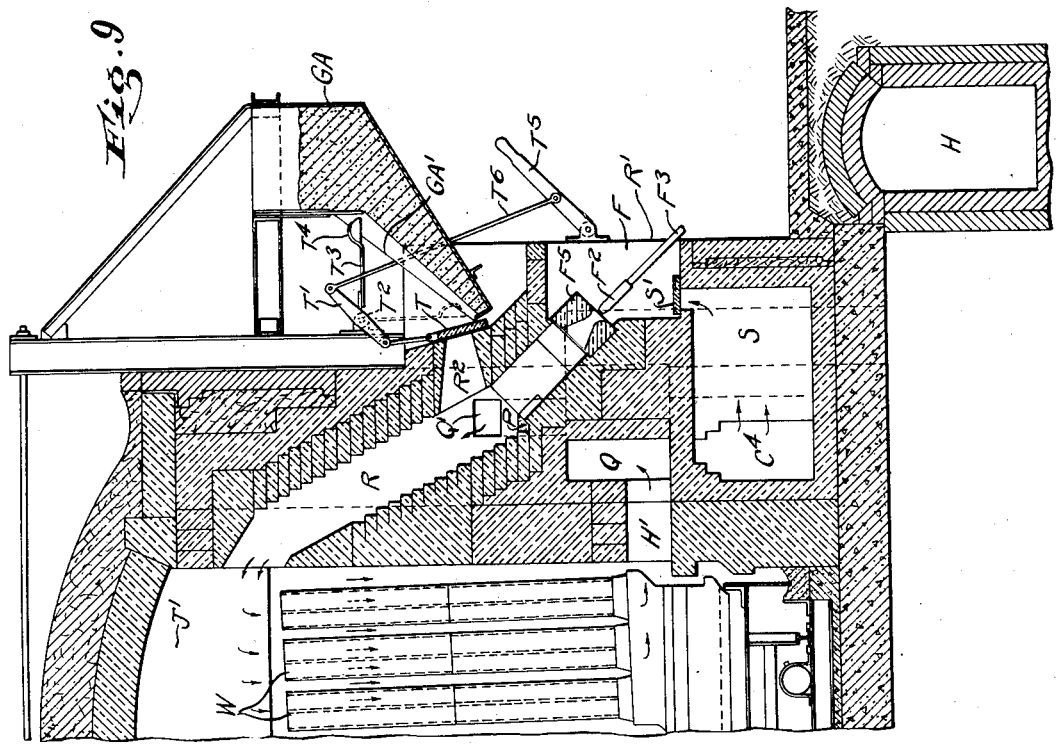
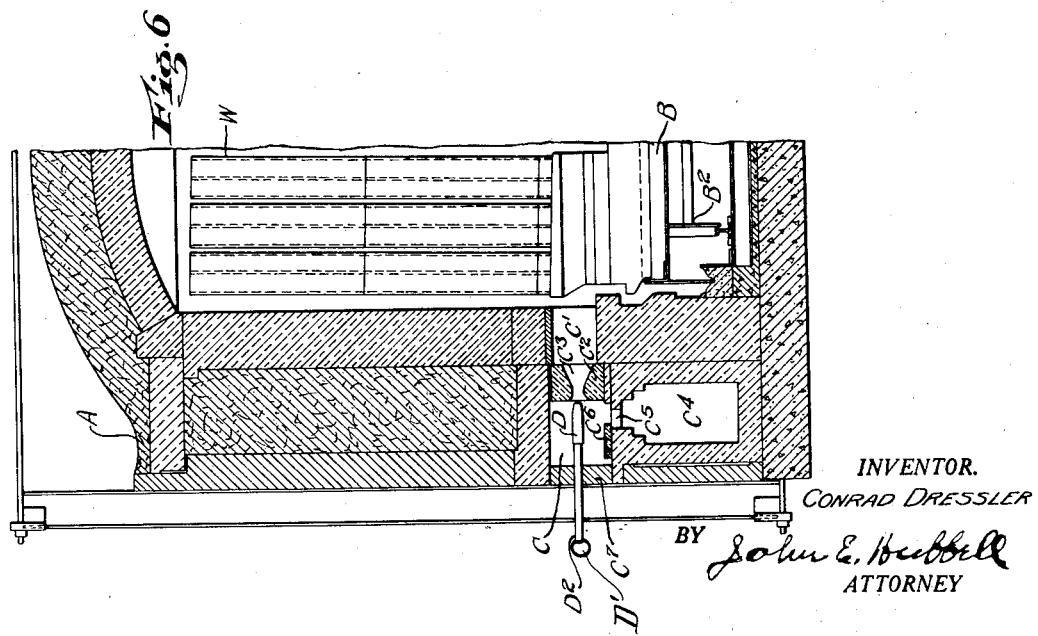
INVENTOR.
CONRAD DRESSLER
BY
ATTORNEY July 25, 1933.  C. DRESSLER  1,919,322
METHOD OF AND APPARATUS FOR GLAZING CERAMIC WARE
Filed Oct. 3, 1930  4 Sheets-Sheet 4
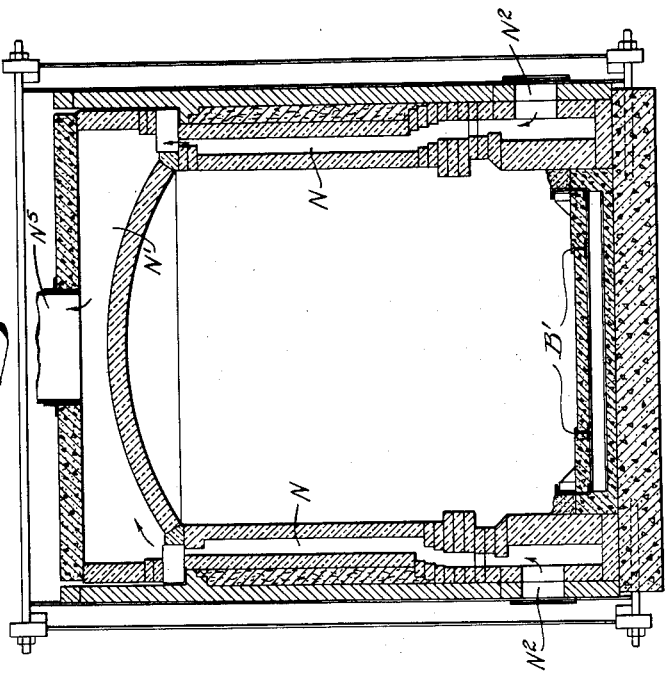
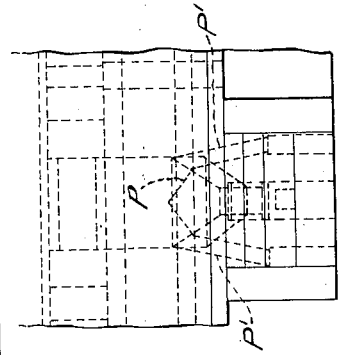
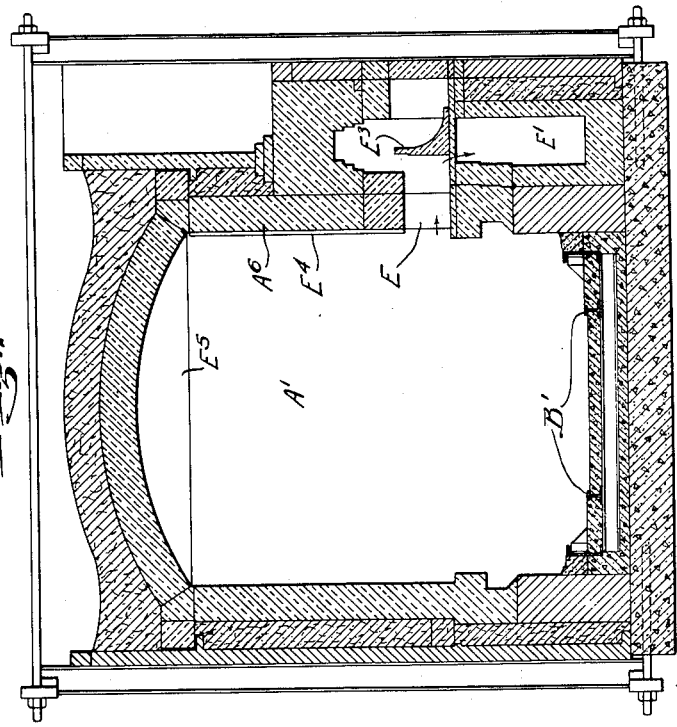
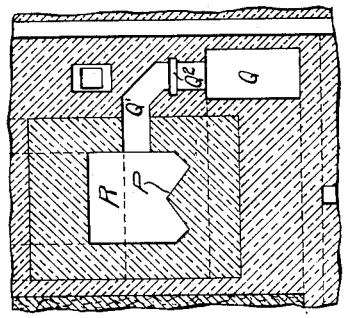
INVENTOR.
CONRAD DRESSLER
BY John E. Hubbell
ATTORNEY Patented July 25, 1933

1,919,322

UNITED STATES PATENT OFFICE

CONRAD DRESSLER, OF PARIS, FRANCE, ASSIGNOR TO SWINDELL-DRESSLER CORPORATION, OF PITTSBURGH, PENNSYLVANIA, A CORPORATION OF PENNSYLVANIA

METHOD OF AND APPARATUS FOR GLAZING CERAMIC WARE

Application filed October 3, 1930. Serial No. 486,152.

My present invention relates to the construction and mode of operation of kilns and kiln apparatus and particularly, of a continuous tunnel kiln primarily intended for carrying out an improved process of glazing ceramic articles. It is well known in the art that when ceramic ware previously heated to a high temperature, is passed into a chamber atmosphere wholly or largely consisting of a glazing agent, such as common salt, in a vaporized condition, the clay at the exposed surfaces of the ware combines with a portion of the salt vapor present to form silicate of soda. The vitreous coating so formed becomes hard and tough when the ware is properly cooled. Ceramic ware so treated is improved in appearance, increased in strength and capable of a prolonged commercial life. The use of common salt as the ware glazing agent is quite extensive for certain heavy clay articles, because of the excellent quality of the glaze obtained and the relatively low cost of this method of application. Glazing processes and apparatus heretofore in use and particularly when applied to the glazing of hollow or tubular ware, such as ceramic conduit tile or sewer pipe, have been in many cases disadvantageously characterized by the lack of uniformity of the glaze on the ware, an excessive waste of the glazing agent, a substantial amount of spoilage of the ware treated, inadequate control of operating conditions, and a low thermal efficiency of the kilns used.

The general object of my present invention is the provision of an improved construction and mode of operation of a continuous tunnel kiln and apparatus for use therewith, all especially adapted for carrying out a salt glazing process. A further object is the provision of an improved ware glazing process. A more specific object is the provision of a glazing kiln having an improved construction and arrangement of the kiln heating and glazing provisions. Another specific object is the provision of a tunnel kiln having means for effecting a recirculation of the kiln atmosphere in the glazing zone. Another object is the provision of a kiln truck especially constructed and designed for transporting large size hollow ware through a glazing kiln and especially advantageous when used with my improved heating and glazing provisions. Another object is the provision of an open fire tunnel kiln having its heating provisions in the furnace zone constructed and arranged to avoid local overheating of and impingement of the burning fuel on the ware on the outside of the trucks when in openly exposed formation thereon, and to provide a more uniform distribution of the heat supplied to the hollow ware throughout the kiln chamber.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:

Fig. 1 is a somewhat diagrammatic plan view of a salt glazing kiln incorporating my improvements;

Fig. 2 is a view illustrating in its left half a vertical section through a salting burner chamber and exhaust port in the glazing zone and in its right half a vertical section through an exhaust port only;

Fig. 3 is a longitudinal vertical section on the line 3—3 of Fig. 2 illustrating the glazing zone side wall construction;

Fig. 4 is a longitudinal horizontal section on the line 4—4 of Fig. 2 illustrating the glazing zone construction;

Fig. 5 is a longitudinal vertical section on the line 5—5 of Fig. 2, illustrating the kiln truck construction;

Fig. 6 is a transverse vertical section through the furnace zone;

Fig. 7 is a vertical section on the line 7—7 of Fig. 1, illustrating the preheating zone construction;

Fig. 8 is a vertical section on the line 8—8 of Fig. 1, illustrating the cooling zone construction;

Fig. 9 is a transverse vertical section of a kiln having a modified construction of the glazing zone;

Fig. 10 is a longitudinal vertical section through the salting burner passage shown in Fig. 9; and Fig. 11 is a plan view of the structure shown in Fig. 10.

In the embodiment of my invention illustrated in Figs. 1 to 8, A designates a continuous tunnel kiln having an elongated kiln chamber or ware passageway $A'$ and divided longitudinally into a plurality of communicating zones or sections indicated in Fig. 1 as a preheating zone $A^2$, extending from the entrance end of the kiln to a furnace zone $A^3$ which in turn extends to a glazing or salt zone $A^4$. The remaining portion of the kiln consists of a cooling zone $A^5$. The ware to be treated is moved through the kiln on a train of kiln cars or trucks B arranged to run on rails $B'$ at the bottom of the kiln chamber. The kiln is constructed in the usual manner with vertical side walls $A^6$ and an arched roof $A^7$, having refractory inner wall portions $A^8$ covered by suitable insulating material $A^9$. The kiln is constructed on a concrete base $A^{10}$ and the walls reinforced by buckstays and tie rods in a well known manner.

Successful operation of a tunnel kiln largely depends upon an effective control of temperature conditions in the various sections of the kiln chamber and particularly in the furnace zone. In the kiln illustrated the furnace zone $A^3$ forms a substantial portion of the kiln length and, as illustrated in Figs. 1 and 6, is formed with a plurality of oppositely arranged burner chambers C, which extend horizontally and transversely in each side wall of the kiln and communicate with the kiln chamber $A'$ through ports $C'$. The inlet ports $C'$ preferably open to the kiln chamber slightly below the platform level of the kiln trucks passing through the chamber.

Each burner chamber encloses a fluid fuel burner D connected to an external fuel supply pipe $D'$ by branch pipes $D^2$ and arranged for axial adjustments relative to a refractory block $C^2$ positioned in the burner chamber at its inner end and formed with a Venturi passage $C^3$ therethrough. The fuel burners illustrated are primarily intended for use with fuel gas partly premixed with air. The amount of air premixed with the gas is preferably less than the amount required for complete combustion. The additional air required for combustion is preferably preheated and supplied to the burner chambers through a longitudinally extending air duct $C^4$ located in the lower portion of the corresponding side wall $A^6$. A connection therewith to the individual burner chambers is provided by ports $C^5$, controlled by externally operated slidable dampers $C^6$. The ports $C^5$ are advantageously located adjacent the outer end of the Venturi blocks $C^2$ to subject the ports to the aspirating action of the gaseous mixture passing through the Venturi passage $C^3$. When any damper $C^6$ is open, air is drawn through the corresponding port $C^5$ and discharged with the premixed air and gas into the kiln chamber. The aspirating effect of the burners can be regulated by axial adjustment of the burner relative to the Venturi passage and the parts are so proportioned and arranged that the aspirating effect can be regulated to produce either a reducing or oxidizing atmosphere in the adjacent portion of the kiln chamber. Individual control of the fuel supply to each burner is advantageously obtained by regulating provisions such as illustrated in Dressler Patent No. 1,615,217, granted January 25, 1927. The combination of regulation of the fuel supply to the individual burners and the regulation of the character of the combustion at each burner enables the operator to readily obtain the most desirable operating conditions in different portions of the furnace zone. The dampers $C^6$ are generally positioned only in a fully open or fully closed position as to attempt air regulation by their adjustment is relatively impractical. The outer end of each burner chamber is normally closed by a removable block $C^7$ to prevent the entry of unpreheated atmospheric air. The substantial length of, and large number of fuel burners in, the furnace zone will be noted, and also the particular longitudinal spacing of the burners. As shown in Fig. 1, the fuel burners are gradually spaced closer together as they approach the glazing zone $A^4$. These factors greatly contribute to the accurate control of temperature conditions and the maintenance of a gradually rising heating curve in the furnace zone.

With the above construction and arrangement, combustible gas mixtures are discharged into opposite sides of the kiln chamber at a large number of points in the furnace zone. With the fuel supply control provisions similarly regulated, a progressively increasing temperature will be maintained along the length of the furnace zone.

The preheating zone $A^2$ arranged between the furnace zone and the entrance end of the kiln is of slightly greater length than the furnace zone. A close regulation of the temperature conditions in the preheating zone is obtained by a series of longitudinally spaced exhaust ports E at the kiln bench level in the slightly enlarged portion thereof indicated in Fig. 1 and which open to a longitudinal duct $E'$ leading to a stack connection $E^2$. The heating gases generated in the furnace zone are thus drawn longitudinally through the preheating zone in contact with the ware therein and the amount of gas withdrawn through any of the exhaust ports E is regulable by externally operated port dampers E³. Side baffles E⁴ and top baffles E⁵ located in the kiln chamber between the ports E′ prevent the heating gases short-circuiting the ware in the preheating zone. An accurate regulation of the preliminary heating of the ware in the preheating zone is especially important when the ware contains carbon or sulphur constituents. The present arrangement of the preheating zone with a substantial length and with the exhaust regulating provisions described permits the maintenance of the desired temperature regulation and distribution of the heating gases to the ware in that section of the kiln.

The trucks B for carrying the ware through the kiln are of a special design particularly adapted for use in a tunnel kiln of the type described herein. As illustrated in Figs. 2, 4, 5 and 6, the lower portion of each truck is constructed in a well known manner with running gear B², a cast steel frame B³ and a refractory base B⁴. The truck superstructure consists of a series of horizontal refractory slabs B⁵, on which are mounted a double series of closely spaced refractory girders B⁶, the girders of each series extending transversely across half the truck width. The upper surfaces B⁷ of the girders are flat to provide a ware supporting platform and the girder sides are suitably shaped to form a plurality of transverse channels B⁸ separated by the vertical sections of the girders. The channels B⁸ open along their length to the chamber space above the truck platform through restricted slots B⁹, as shown in Figs. 4 and 5. The truck channels open at the sides of the kiln chamber at the level of the inlet ports C′ of the burner chambers and by which arrangement, the combustible gases discharged through the ports will pass directly into the truck channels. The ware platform is of substantial area and permits the transportation of ware pieces of different sizes without interference with the circulation of gases through the slots B⁹. Free expansion and contraction of the slabs B⁵ and girders B⁶ are permitted by the expansion joints B¹⁰ shown between adjacent parts. By the above arrangement all of the ware is positioned above the level of the burner ports C′ and out of the direct horizontal path of the burning gases. The truck construction illustrated is particularly advantageous for carrying hollow ware and will provide a uniform distribution of the heating gases to the ware pieces in all parts of the truck.

The kiln section forming the glazing zone A⁴ is, as shown in Fig. 1, of slightly greater cross-sectional area than the other portions of the kiln. The height of the kiln chamber is increased to provide a combustion space J of substantial volume above the top of the ware. This combustion space is limited longitudinally by a pair of vertical baffles J′ depending from the arched roof of the kiln and extending across substantially all of the chamber area above the ware. The roof is formed with a pyrometer opening J², as shown.

The glazing zone kiln section is constructed with a series of transversely extending longitudinally spaced burner chambers F arranged in opposite side walls of the kiln and preferably opening to the kiln chamber through inlet ports F′ at a level above the top of the ware on the trucks. A salting burner F² connected by pipe F³ and F⁴ to an external supply of premixed air and gas is axially arranged in each burner chamber F in substantially the same manner as the furnace zone burners and axially adjustable relative to a Venturi block F⁵ at the burner chamber inner end. The outer end of each chamber is normally closed by a removable block F⁶.

The ware glazing agent, preferably common salt, to be delivered in a vaporized condition to the ware in the kiln chamber, is stored in an external hopper G adjacent each burner and adapted to be withdrawn therefrom by a rotating screw conveyor G′. This screw discharges into a vertical pipe G² opening at its lower end into the supply pipe F³. The velocity of the premixed air and gas passing through the pipe F³ from the source of supply is sufficient to entrain the salt dropping through the pipe G² and carry it in a finely divided condition through the Venturi block F⁵ and port F′ into the kiln chamber section J, where it is vaporized by the heat generated by the burning fuel. The intimately mixed salt fumes and highly heated products of combustion are passed downwardly around and through the ware and into the truck channels B⁸. The side walls in this portion of the kiln are provided at the kiln bench level with a plurality of horizontally and transversely arranged exhaust passages H′ closely spaced longitudinally and connected adjacent their outer ends to exhaust or fume collecting ducts H through ports H² controlled by externally operated slidable dampers H³. The number of exhaust passages H′ is substantially greater than the number of salting burners. The outer ends of the passages H′ are closed by removable blocks H⁴. The exhaust ducts H extend longitudinally throughout the glazing zone and are connected at one end to an induced draft connection H⁵.

In the operation of glazing apparatus of the character described, a large proportion of the salt fumes passing through the chamber is not absorbed by the ware. This has heretofore been wasted in kilns of the character described. To substantially reduce this waste of material and consequently the cost of glazing, I have provided a recirculation system for returning a portion of the unabsorbed salt fumes to the kiln chamber in the glazing zone. In the present construction vertical recirculation flues K are formed in the kiln side walls connecting certain of the exhaust passages H' to corresponding salting burner chambers F. The lower end of each vertical flue is controlled by a slidable damper K', and the upper end, opening to the burner chamber, by a similar damper $K^2$. With this construction and the corresponding dampers $H^3$ closed and dampers K' and $K^2$ open the aspirating effect of the gases passing through the Venturi block $F^5$ is sufficient to create a strong suction in the flues K causing salt fumes and products of combustion to be drawn from the exhaust ports H' upwardly through the flues K and returned to the kiln chamber through the ports F'. Thus under all conditions of operation a down draft circulation will be maintained in the kiln chamber in the glazing zone.

While ordinarily the salting burners $F^2$ are preferably operated to provide a reducing atmosphere in the kiln chamber, means are provided for effecting a neutral or an oxidizing atmosphere. As illustrated in Figs. 2 and 3, the preheated air duct $C^4$ is connected to each of the vertical flues K by a short vertical passage $K^3$ controlled by a slidable damper $K^4$, which, when open, permits a supply of air to be drawn up the flues K by the aspirating action of the burners. The dampers K', $K^2$ and $K^4$ can be easily adjusted to regulate the amount of preheated air for combustion and recirculated salt fumes passing through the flues K to the salting burners in whatever proportions are desired.

The ware after being fired and glazed is passed through the cooling zone $A^5$ adjacent th exit end of the kiln. It is highly important in tunnel kiln practice, and particularly where a glazing process is being carried out, to so regulate the cooling action as to avoid the cracking of the ware and rupture of the kiln structure which tends to occur when the temperature conditions in the cooling zone vary from the normal curve. This portion of the kiln is constructed with side wall and roof passages N and N', respectively, as shown in Fig. 8, to permit the flow therethrough of a cooling medium. The cooling medium is preferably atmospheric air admitted at longitudinally spaced controllable inlets $N^2$ in the side walls. The air thus admitted absorbs heat radiated to the kiln structure by the ware and is subsequently drawn from the cooling space N' by a hot air fan $N^3$ through a conduit $N^4$ connected thereto at one or more points $N^5$ along its length, as indicated in Fig. 1. The heated air exhausted by the fan is delivered to the kiln chamber through a special nozzle $N^6$ at the under side of the kiln crown adjacent the exit end of the kiln. The heated air passes into direct contact with the ware on the trucks and is drawn longitudinally through the cooling zone to air outlets $N^7$ adjacent the exit end of the glazing zone. The heated air passes from the outlets $N^7$ into the air duct $C^4$ in the side walls and is utilized as previously described.

Whenever the amount of air exhausted by the fan $N^3$ exceeds the amount required for direct cooling of the ware and combustion, the excess may be utilized in separate ware driers or for plant heating. The kiln structure at the rearmost portion of the cooling zone is formed by a steel walled casing $N^8$ of reduced size, which construction provides a more rapid indirect cooling of the ware before the trucks emerge from the kiln.

Uninterrupted service of kilns used for salt glazing has been extremely difficult heretofore because of the extensive deposits of the glazing agent on the exposed portions of the kiln structure, which cause rapid deterioration of the kiln structure and clogging of the fume passages. The present kiln section in the glazing zone is so constructed as to permit periodic cleaning of the various passages without interrupting the operation of the kiln. Clean-out openings $K^5$ are formed in the upper side walls of the kiln directly above the vertical flues K. Suitable tools can be inserted through the openings when the dampers K' and $K^2$ are open to remove salt deposits from the flues K. The exhaust passages H' can be rendered accessible for cleaning by removing the blocks $H^4$. The Venturi passage and inlet port $F^5$ are rendered accessible when the corresponding burner is temporarily shut off, by removing the blocks $F^6$. These portions of the kiln structure are continuously exposed to clogging and deterioration and the above provisions substantially eliminate any trouble of this character.

With the kiln structure and apparatus constructed and arranged as described, trucks loaded with the ceramic ware to be treated are periodically introduced into the entrance end of the kiln. The trucks are shown loaded with a large number of pieces of conduit tile W stacked in a double tier on the truck platforms, although it will be understood that other kinds of ware and stacking arrangements than that shown can be readily used. The trucks are slowly advanced through the kiln chamber by the periodic operation of a truck pushing mechanism of a well known character. The ware during its passage through the preheating zone is gradually and uniformly heated to a predetermined temperature before entering the furnace zone. The progressively closer spacing of the burners in the furnace zone and the permissible individual regulation of each burner enables the operator to regulate the temperature conditions therein to bring the ware to its maximum temperature before passing into the glazing zone.

The combustible mixture discharged from each burner chamber C passes through the inlet ports C' into the combustion channels B⁸ of the kiln truck adjacent thereto, substantially all of the combustion taking place in the inlet ports and truck channels. The opposed arrangement of the fuel burners effects substantially uniform combustion conditions throughout the length of the combustion channels from which the burning gases move upwardly through the multiplicity of channels formed within and between the individual ware pieces. The burner arrangement and truck construction insures a uniform distribution of the heating gases throughout all portions of the ware. The heating gases passing upwardly in intimate contact with the ware are drawn longitudinally through the kiln towards the entrance end thereof and into and through the preheating zone by the draft creating means provided. Any tendency towards longitudinal movement of the kiln atmosphere from the furnace and cooling zones to the glazing zone is minimized by the arrangement of the depending baffles J' and a suitable regulation of the separate draft creating means for these sections to maintain balanced pressure conditions therein.

On leaving the furnace zone the ware enters an atmosphere of salt vapor circulating downwardly through the kiln chamber and in intimate contact with the inner and outer exposed surfaces of the ware. The salt fumes not absorbed by the ware are drawn downwardly through the ware platform into the transverse truck channels B⁸, through the exhaust passages H', and into the exhaust duct H by the draft connection thereto. Normally a reducing atmosphere is maintained in the glazing zone, but if desired, this atmosphere may be made neutral or oxidizing by adjusting the recirculation flue connection with the air duct C⁴. The recirculation passage dampers are adjusted to regulate the amount of salt vapor returned to the kiln chamber. It will be noted that the glazing zone is substantially independent in operation having a circulation system not affected by or affecting the circulation in the other portions of the kiln. The heating action of the salting burners F² serves to vaporize the glazing agent and to maintain the ware at substantially the same temperature as leaving the furnace zone.

On leaving the glazing zone, the ware is subjected to both indirect and direct cooling effects in the cooling zone, which gradually lower the temperature of the ware to a point at which it can be safely removed from the kiln. As described heretofore, the atmosphere control provisions in the cooling zone can be regulated to maintain any desired cooling temperature curve therein, the regulation in effect being primarily dependent on the character of the ware being treated.

It is advantageous in most glazing kilns to use a relatively long operating cycle and in one such kiln incorporating my invention, for example, each ware truck requires 66 hours to pass through a complete cycle, of which period about 18 hours are spent in the preheating zone, 17 in the furnace zone, 6 in the salting zone, and 25 in the cooling zone.

Among the advantages of the present tunnel kiln construction is the relatively large cross-sectional area of its kiln chamber which permits an increase in the ware tonnage carried during each cycle and an increase in length of the cycle without a corresponding increase in kiln length. This increases the daily capacity of the kiln and reduces the number of trucks required in use and the labor of handling the same. The various regulating provisions described permit an accurate control of temperature conditions through every zone of the kiln. The large number of relatively small fuel burners distributed in the manner described over the elongated furnace zone and their capacity for individual regulation materially aids the maintenance of the most desirable temperature conditions in that zone and eliminates the development of excessive local temperatures therein. The main heating of the ware, which occurs in the furnace zone, advantageously takes place beneath the ware with the products of combustion passing upwardly through the multiplicity of channels in the trucks and formed by the ware. The surfaces of the ware, and particularly the outer ware pieces, are not subjected to any direct flame impingement in any portion of the kiln. The maintenance of an up-draft circulation of the heating gases in the furnace zone insures advantageous heating conditions, and the use of an independent down-draft circulation of the salt fumes in the glazing zone in conjunction therewith increases the kiln efficiency. The distribution of the salt vapors throughout the space above the ware before coming into contact with the ware insures a uniform distribution of the glazing agent to all parts of the ware and consequently a uniform glaze. The amount of the glazing agent required for a given amount of ware is substantially reduced by the fume recirculation system described. The kiln truck construction described provides a ware supporting platform of substantial area and maintains the ware in a stable condition, and the truck circulation channels are of sufficient volume to provide a substantially unrestricted gas flow therethrough.

While the kiln is described and illustrated as being fired by fuel burners using premixed air and gas, other types of heating means and fuels can also be effectively used, such as clean producer gas, oil, or coal. Producer gas would not require premixing with air. Fuel burners using oil would be supplied with an atomizing agent, such as air or steam. The aspirating action described can be carried out with either of these fuels. In some cases, coal fired on grates in the side walls of the furnace and salting zones may be used effectively.

In Figs. 9–11, I have illustrated a modified form of salting zone construction in a tunnel kiln of this general type. In this arrangement, each salting burner $F^2$, is positioned in the lower end of a corresponding inclined passage R in the side wall of the kiln and opening to the kiln chamber $A'$ above the upper level of the ware W. The outer end of the salting burner passage is closed by a metal plate $R'$. Preheated air for combustion can be delivered to the burner, if desired, from the air duct $C^4$ through a passage S controlled by a damper $S'$. The glazing salt is stored in a suitable external hopper GA open at its inner lower side $GA'$ to permit the salt therein to be scooped up and discharged through a corresponding salt inlet opening $R^2$ in the kiln side wall. The bottom of the salt inlet is inclined as shown and opens to the burner passage R above the Venturi block $F^5$. The outer end of the salt opening is closed by a door T, pivotally connected to an oscillatable lever $T'$, which is fixed on a shaft $T^2$. This shaft carries an arm $T^3$, on the outer end of which a conveying scoop or cut $T^4$ is mounted. The door and scoop are simultaneously operated periodically through a pivoted operating lever $T^5$ connected to the lever $T'$ by a link $T^6$. These parts are relatively arranged to permit the door to be raised before the scoop reaches its dotted line discharge position. The salt taken up by the scoop while passing into the open side of the hopper is delivered through the salt opening $R^2$ as required. The salt comes to rest on a ledge P and flattened inverted V-shape, as shown in Figs. 10 and 11, at the inner side of the burner passage R and below the corresponding inlet $R^2$. The salt is vaporized during its passage to and while on the ledge P and delivered to the kiln chamber in a vaporized condition. Recirculation of the kiln atmosphere to return the salt fumes not absorbed by the ware to the chamber is effected through the exhaust passage $H'$ and a fume collecting flue Q, which opens to a longitudinal duct H leading to a stack and also to the burner passage R through a passage $Q'$ adjacent the salt inlet opening. The passages $Q'$ can be controlled by dampers $Q^2$ in the manner heretofore described to regulate the fume recirculation. In some cases, the described manual feeding of the salt is preferred to the use of mechanical arrangements.

Due to the inclined arrangement of the salting burner passage R in this construction, any molten salt or glaze in the passage tends to flow down over the ledge P into the lower end of the passage and clog the Venturi passage and fuel burner discharge openings. To avoid such a condition I have provided discharge passage $P'$ in the side walls and opening at each side of the ledge P and which prevent the accumulation of molten material on the ledge and I thereby avoid any interruptions in the kiln operation. Continuity of operation is highly essential and seldom attained heretofore.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. The method of glazing ceramic ware which comprises moving the ware through a kiln chamber, heating the ware during its passage through the chamber to a high temperature, introducing a glazing agent in finely divided form into a high temperature section of the kiln chamber, vaporizing the glazing agent introduced by the combustion of fuel burning in contact with said agent immediately adjacent the point or points of introduction of the latter therewith, and passing the glazing vapors and heating gases so formed downwardly through said kiln chamber in intimate contact with the exposed ware surfaces.

2. The method of glazing ceramic ware which comprises moving the ware through a kiln chamber, heating the ware during its passage through the chamber to a high temperature, simultaneously introducing a combustible gaseous mixture and a glazing agent in finely divided form into a high temperature section of the kiln chamber at the same point or points above the top of the ware therein, vaporizing the glazing agent introduced by burning said gaseous mixture and passing the glazing vapors and heating gases so formed while distributed over a major portion of said high temperature section downwardly through said kiln chamber and in intimate contact with the exposed ware surfaces.

3. The method of glazing ceramic ware which comprises moving the ware through a kiln chamber, heating the ware during its passage through the chamber to a high temperature, introducing a glazing agent in finely divided form into a high temperature section of the kiln chamber, vaporizing the glazing agent introduced by the combustion of fuel introduced therewith, passing the glazing vapors and heating gases so formed downwardly through said kiln chamber in intimate contact with the exposed ware surfaces, withdrawing the glazing vapors unabsorbed by the ware from the kiln chamber, and recirculating a portion of the vapors so withdrawn into contact with the ware.

4. The method of glazing ceramic ware which comprises moving the ware through a kiln chamber, heating the ware during its passage through the chamber to a high temperature, introducing a combustible gaseous mixture and a glazing agent in finely divided form into a high temperature section of the kiln chamber above the top of the ware therein, vaporizing the glazing agent introduced by burning said gaseous mixture, passing the glazing vapors and heating gases so formed while distributed over a major portion of said high temperature section downwardly through said kiln chamber and in intimate contact with the exposed ware surfaces, withdrawing the glazing vapors unabsorbed by the ware from the kiln chamber, and recirculating a portion of the vapors so withdrawn into contact with the ware.

5. The method of glazing ceramic ware which comprises moving the ware through a kiln chamber, heating the ware during its passage through the chamber to a high temperature, and glazing the ware while at a high temperature by passing a glazing agent in vaporized form in a closed flow circuit including the ware in said kiln chamber.

6. The method of glazing ceramic ware which comprises moving the ware through a kiln chamber, heating the ware during its passage through the chamber to a high temperature, subjecting the ware while at a high temperature to the action of a vaporized glazing agent to form a glaze on the exposed ware surfaces, withdrawing the unabsorbed vapors from the kiln chamber, and returning a portion of the vapors so withdrawn into contact with the ware.

7. The method of glazing ceramic ware which comprises moving the ware through a kiln chamber, heating the ware during its passage through the chamber to a high temperature, subjecting the ware while at a high temperature to the action of a vaporized glazing agent to form a glaze on the exposed ware surfaces, withdrawing the unabsorbed vapors from the kiln chamber, and recirculating a predetermined portion of the vapor so withdrawn downwardly through said kiln chamber.

8. The method of glazing ceramic ware which comprises moving the ware through a kiln chamber, heating the ware during its passage to a high temperature by passing heating gases upwardly in contact with the ware, and subjecting the ware while at said high temperature to the glaze forming action of a vaporized glazing agent passing downwardly through and in contact with the exposed ware surfaces.

9. The method of glazing ceramic ware which comprises moving the ware through a kiln chamber, heating the ware during its passage to a high temperature by passing high temperature heating gases upwardly through the ware, and subsequently subjecting the ware while at said high temperature to the glaze forming action of a vaporized glazing agent passing downwardly through and in intimate contact with substantially all of the exposed goods surfaces.

10. The method of salt glazing ceramic ware which comprises moving the ware through a kiln chamber, progressively heating the ware during its passage to a high temperature by the combustion of premixed air and gas below the ware and passing the products of combustion upwardly through and in intimate contact with the ware, subjecting the ware while at a high temperature to the action of salt vapors passed downwardly through and in intimate contact with the goods, withdrawing the unabsorbed salt vapors from the bottom of the kiln chamber, and returning the salt vapors so withdrawn into contact with the ware in the upper part of the kiln chamber.

11. The method of glazing ceramic ware which comprises moving the ware through an elongated kiln chamber, heating the ware during its passage through the chamber to a high temperature, subjecting the ware while at a high temperature to the action of a glazing agent vaporized by the burning of fluid fuel and air in the kiln chamber, to form a glaze on the exposed ware surfaces, withdrawing the unabsorbed vapors from the kiln chamber, recirculating a portion of the vapors so withdrawn into contact with the ware and supplying preheated air for combustion with said recirculated vapors.

12. The method of glazing ceramic ware which comprises moving the ware through a kiln chamber, heating the ware during its passage through the chamber to a high temperature, simultaneously introducing a combustible mixture of air and gas and a glazing agent in finely divided form into a high temperature section of the kiln chamber at the same point or points above the top of the ware therein, vaporizing the glazing agent introduced by burning said mixture, passing the glazing vapors and heating gases so formed while distributed over a major portion of said high temperature section downwardly through said kiln chamber and in intimate contact with the exposed ware surfaces, and regulating the character of the kiln atmosphere in the glazing zone by supplying preheated air for combustion to the upper part of said kiln chamber.

13. A continuous tunnel kiln adapted for glazing ceramic ware and comprising means for moving the ware through an elongated kiln chamber, means for heating the ware during its passage through the chamber to a high temperature, means for simultaneously introducing a glazing agent in finely divided form and a combustible mixture into a high temperature section of the kiln chamber and burning said mixture therein to vaporize the glazing agent introduced, and means for passing the glazing vapors so formed downwardly through said kiln chamber and in intimate contact with the exposed ware surfaces.

14. A continuous tunnel kiln formed with an elongated ware passageway extending through successive preheating, furnace, and glazing zones, means for passing heating gases upwardly through the ware passageway in the furnace zone, means for passing a vaporized glazing agent downwardly through the ware passageway in the glazing zone, and means for withdrawing the glazing vapors from the ware passageway and recirculating the vapors so withdrawn.

15. A tunnel kiln having a salt glazing zone comprising a kiln chamber formed by the kiln side walls and in which the ware to be glazed is positioned, and means for supplying a glazing agent in vaporized form to the ware in said kiln chamber including an inclined passage in one of the kiln side walls opening to the kiln chamber above the level of the ware therein, fuel burning means in the lower end of said passage, and means for mixing a glazing agent with the products of combustion from said fuel burning means.

16. A tunnel kiln car having a superstructure adapted for supporting hollow ceramic ware having vertical passages therein, said superstructure comprising a longitudinal series of transverse refractory girders having enlarged base portions substantially in contact, recessed web portions cooperating to form transverse gas channels opening at their upper ends into communication with said ware passages, and flat upper surfaces on said girders on which the ware is directly supported.

17. A continuous tunnel kiln formed with an elongated kiln chamber extending through successive preheating, furnace, and glazing zones, a series of fluid fuel burners located in the side walls of said kiln chamber at the bench level of the kiln in said furnace zone, a series of fluid fuel burners in the side walls of said kiln chamber above the normal top level of the ware in said glazing zone, means for discharging a finely divided glazing agent into said kiln chamber with the heating gases from said second burner series, means effecting an upward circulation of heating gases in said furnace zone, means effecting a downward circulation of glazing vapors and heating gases in said glazing zone comprising a series of exhaust passages in the kiln side walls of said glazing zone, and recirculation flues connecting certain of said exhaust passages with said second burner series.

18. A continuous tunnel kiln formed with an elongated kiln chamber extending through successive preheating, furnace and glazing zones, a series of fluid fuel burners located in the side walls of said kiln chamber at the bench level of the kiln in said furnace zone, a series of fluid fuel burners in the side walls of said kiln chamber above the normal top level of the ware in said glazing zones, means for discharging a finely divided glazing agent into said kiln chamber with the heating gases from said second burner series, means effecting an upward circulation of heating gases in said furnace zone, means effecting a downward circulation of glazing vapors and heating gases in said glazing zone comprising a series of exhaust passages in the kiln side walls of said glazing zone, recirculation flues connecting certain of said exhaust passages with said second burner series, a preheated air conduit connected to said recirculation flues, and means for controlling the amounts of air and gases passing into said recirculation flues from said air conduit and exhaust passages, respectively.

19. A continuous tunnel kiln formed with an elongated kiln chamber extending through successive preheating, furnace, and glazing zones, a series of fluid fuel burner chambers in the side walls of said kiln chamber above the normal top level of the ware in said glazing zone, a fuel burner in each of said burner chambers, means for mixing a finely divided glazing agent with the fuel supply to said burners, means effecting a downward circulation of glazing vapors and heating gases in said glazing zone comprising a series of transverse exhaust passages in the kiln side walls of said glazing zone, and vertical recirculation flues connecting certain of said exhaust passages with said burner chambers, and means for controlling the passage of gases through said recirculation flues.

20. A continuous tunnel kiln formed with an elongated kiln chamber extending through successive preheating, furnace, and glazing zones, a series of fluid fuel burner chambers in the kiln side walls opening to said kiln chamber above the normal top level of the ware in said glazing zone, a fuel burner in each of said burner chambers, manually operated means for discharging a finely divided glazing agent into said fuel burner chambers, means for preventing the flow of liquefied glazing material through a predetermined portion of said burner chambers, means effecting a downward circulation of glazing vapors and heating gases in said glazing zone comprising a series of exhaust passages in the kiln side walls of said glazing zone, and recirculation flues connecting said exhaust passages with said burner chambers.

21. In glazing ceramic ware in a continuous tunnel kiln having a goods space which comprises a heating section including a high temperature portion at one end of the section and a glazing section adjacent said portion, the method which consists in moving the goods treated first through the heating section and then through the glazing section of the goods space, passing heating gases at high temperatures upwardly through said high temperature portion of said heating section in contact with the goods therein and thence longitudinally through the goods space in contact with the goods in a direction leading away from the glazing section, supplying a volatilized glazing agent to the upper portion of the glazing section, moving said agent downward through said glazing section in contact with the goods, and withdrawing said agent from the goods space at the bottom of the glazing section thereof.

22. In glazing ceramic ware in a continuous tunnel kiln having a goods space which comprises a heating section including a high temperature portion at one end of the section and a glazing section adjacent said portion, the method which consists in moving the goods treated first through the heating section and then through the glazing section of the goods space, passing heating gases at high temperatures upwardly through said high temperature portion of said heating section in contact with the goods therein and thence longitudinally through the goods space in contact with the goods in a direction leading away from the glazing section, supplying a glazing agent, fuel and air for the combustion of the fuel to the upper portion of the glazing section, moving the mixture of burning gases, gaseous products and volatilized glazing agent formed by the combustion of the fuel downward through said glazing section in contact with the goods, and withdrawing said mixture from the goods space at the bottom of the glazing section thereof.

23. The combination in a continuous tunnel kiln for glazing ceramic ware having a goods space comprising heating and cooling sections and a glazing zone intermediate said sections and means for moving goods successively through the heating section, the glazing section and the cooling section, of means for introducing burning gases at high temperatures into the bottom of the portion of the said heating section adjacent the glazing section, and passing said gases upwardly in said section in contact with the goods therein and thence longitudinally through the portion of the goods space more remote from the glazing zone, means for supplying a glazing agent to the upper portion of said glazing zone, and means for withdrawing gases from the goods space at the bottom of the glazing zone portion thereof, whereby the glazing agent is caused to pass downwardly in contact with the goods in said glazing section.

24. The combination in a continuous tunnel kiln for glazing ceramic ware having a goods space comprising heating and cooling sections and a glazing zone intermediate said sections and means for moving goods successively through the heating section, the glazing section and the cooling section, means for introducing burning gases at high temperatures into the bottom of the portion of the said heating section adjacent the glazing section, and passing said gases upwardly in said section in contact with the goods therein and thence longitudinally through the portion of the goods space more remote from the glazing zone, means for supplying a glazing agent, and fuel for combustion in immediate contact with said agent to the upper portion of said glazing zone, and means for withdrawing gases from the goods space at the bottom of the glazing zone portion thereof, whereby the glazing agent and products of combustion of said fuel are caused to pass downwardly in contact with the goods in said glazing section.

CONRAD DRESSLER.